United States Patent Office 2,813,029
Patented Nov. 12, 1957

2,813,029

PEANUTS AND METHOD OF PREPARING SAME FOR EDIBLE CONSUMPTION

Russell O. Shirk, Bloomington, Ill.

No Drawing. Application February 7, 1955,
Serial No. 486,725

3 Claims. (Cl. 99—126)

This invention relates to a more palatable peanut and to the method of preparing a peanut for more palatable eating.

It is among the objects of my invention to increase the palatability and enjoyment of peanuts and to provide a method of preparing peanuts that will enhance their palatability and edible quality.

My invention also comprises such other objects, advantages and capabilities as will later more fully appear and which are inherently possessed by my invention. While I have described in this specification preferred embodiments of my invention, yet it is to be understood that same are susceptible of modification and change without departing from the spirit of my invention.

In my preferred method, I take 20 pounds of shelled, raw, uncooked Virginia red skin peanuts with the skins left on, and place them in a receptacle. I pour 2 pounds of glucose, preferably corn syrup into the receptacle containing the peanuts and stir the same. I then transfer the contents of said receptacle to an 18 inch kettle containing 25 to 30 pounds of vegetable oil preferably cocoanut oil heated to 315° F. This, of course, reduces the heat of the contents to about 270° F. I stir the contents of the kettle and gradually build back the temperature until it again reaches 315° F. This takes substantially 15 minutes. When 315° F. is reached I dump the nuts out on a strainer which permits the oil to drain off. This draining takes about 7 minutes. Then I place the cooling nuts on a table, separate them at once, salt them and package them.

My method creates peanuts slightly and pleasantly sweetened in flavor. The skins and the nuts themselves are provided by the method with an increased palatability. Users are extraordinarily pleased by the flavor thus acquired and eat my peanuts with increased enjoyment and in greater quantities.

I may vary my method by using as little as 1 pound of corn syrup to 20 pounds of peanuts to as much as 3 pounds of corn syrup to 20 pounds of nuts.

My method is also applicable to peanuts with or without the skins, to Spanish and blanched peanuts, and to nuts other than peanuts such as filberts, Brazils and cashews.

The temperature of the vegetable, or cocoanut oil may vary between 300° F. and 325° F. at both steps in my method.

Having thus described my invention, I claim:

1. The method of preparing shelled, raw, uncooked red skin peanuts with the skins left on for edible consumption, comprising placing said peanuts in a receptacle, pouring corn syrup on said peanuts and stirring the same, transferring the contents of said receptacle to a kettle containing cocoanut oil heated to 315° F., stirring and heating the mixture of peanuts with the skins left on, glucose and cocoanut oil in said kettle until 315° F. is again reached in the kettle, dumping the contents from the kettle onto a strainer, permitting the glucose and cocoanut oil to drain off the peanuts, placing the peanuts on a table and separating the peanuts.

2. The method of preparing shelled, raw, uncooked red skin peanuts with the skins left on for edible consumption comprising stirring 20 pounds of said peanuts in a receptacle containing 1 to 3 pounds of corn syrup, transferring the same to a kettle containing 25 to 30 pounds of cocoanut oil heated to 315° F., stirring and heating the mixture of peanuts with the skins left on, glucose and cocoanut oil in said kettle until 315° F. is again reached in the kettle, dumping the contents from the kettle onto a strainer, permitting the mixed glucose and cocoanut oil to drain off the peanuts, placing the peanuts on a table and separating the peanuts.

3. The method of preparing shelled, raw, uncooked Virginia red skin peanuts with the skins left on for edible consumption, comprising adding 2 pounds of corn syrup to 20 pounds of said peanuts and stirring the same in a receptacle, transferring the contents of the receptacle to an 18 inch kettle containing 25 to 30 pounds of cocoanut oil heated to 315° F., stirring and heating the mixture of peanuts with the skins left on, glucose and cocoanut oil in said kettle for substantially 15 minutes until 315° F. is again reached in the kettle, dumping the contents from the kettle onto a strainer, permitting the mixed glucose and cocoanut oil to drain off the peanuts, placing the peanuts on a table and separating the peanuts.

References Cited in the file of this patent

UNITED STATES PATENTS

| | | |
|---|---|---|
| 931,137 | McDonald et al. | Aug. 17, 1909 |
| 1,154,059 | Rosell | Sept. 21, 1915 |
| 1,908,059 | Sawin | May 9, 1933 |

OTHER REFERENCES

"Marketing Peanuts and Peanut Products," U. S. Dept. of Agr. Misc. Publication No. 416, pages 68 to 71, September 1941.